J. HOBBS.
Churn Dasher.
No. 50,122.
Patented Sept. 26, 1865.
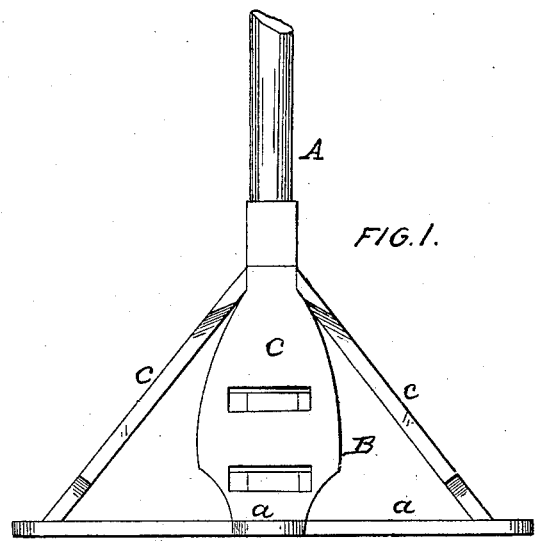
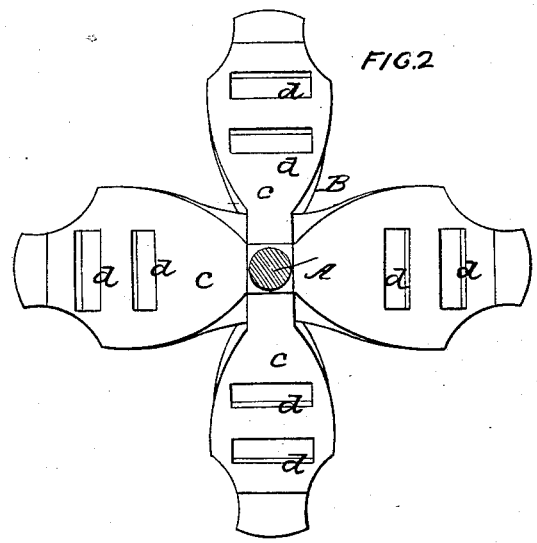
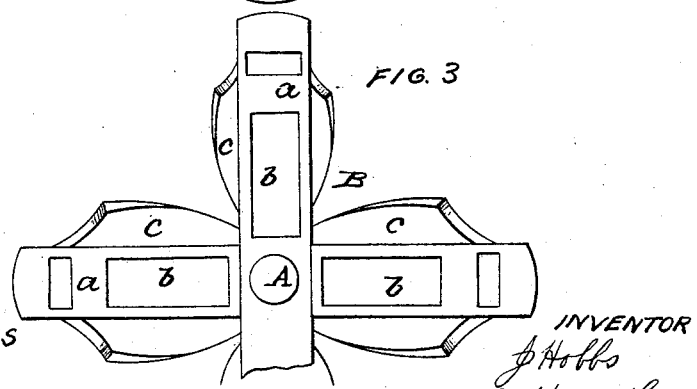

UNITED STATES PATENT OFFICE.

JONAS HOBBS, OF NORTH SANFORD, NEW YORK.

IMPROVEMENT IN CHURN-DASHERS.

Specification forming part of Letters Patent No. 50,122, dated September 26, 1865.

*To all whom it may concern:*

Be it known that I, JONAS HOBBS, of North Sanford, in the county of Broome and State of New York, have invented a new and Improved Churn-Dash; and I do hereby declare that the following is a full, clear, and exact description thereof, which will enable those skilled in the art to make and use the same, reference being had to the accompanying drawings, forming part of this specification, in which—

Figure 1 is a side view of my invention; Fig. 2, a plan or top view of the same; Fig. 3, an inverted plan of the same.

Similar letters of reference indicate corresponding parts.

This invention consists in constructing the dash or dasher in such a manner that the air, during the process of churning, will be incorporated with the cream, and the latter subjected to a considerable degree of agitation, whereby all the butter contained in the cream will be produced in a short period of time.

A represents the staff of the dash, and B the dash secured to the lower end of the staff, with oblong openings $b$ made in them, as shown in Fig. 3; and $c$ represent four inclined bars, the upper ends of which are attached to the staff A, and the lower ends attached to the outer ends of the bars $a$. These bars $c$ have each two openings, $d$, made in them, which are somewhat narrow and extend transversely across the bars $c$, as shown in Figs. 1 and 2.

The dash thus constructed passes easily up and down through the cream, breaking the same, and causing a great deal of agitation, and incorporating the air with the cream, so as to favor the rapid production of butter. It has been practically tested, and operates well, producing better results than other reciprocating dashes in use. It may be cheaply constructed and used with any of the ordinary reciprocating churns, or those designed for a reciprocating dash.

Having thus described my invention, I claim as new and desire to secure by Letters Patent—

A churn-dash constructed of two cross-bars, $a\,a$, provided with oblong openings $b\,b$, and with inclined bars $c$ attached to the outer ends of the cross-bars $a$ and to the dash-staff A, and provided with openings $d$, substantially as herein shown and described.

JONAS HOBBS.

Witnesses:
   J. W. HOBBS,
   C. H. HOBBS.